US012359647B2

(12) United States Patent
Weston et al.

(10) Patent No.: US 12,359,647 B2
(45) Date of Patent: Jul. 15, 2025

(54) ADAPTIVE EXHAUST CONTROL FOR REMOTE START

(71) Applicant: FORD GLOBAL TECHNOLOGIES, LLC, Dearborn, MI (US)

(72) Inventors: Keith Weston, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 18/305,060

(22) Filed: Apr. 21, 2023

(65) Prior Publication Data

US 2024/0352912 A1 Oct. 24, 2024

(51) Int. Cl.
*F02N 11/08* (2006.01)

(52) U.S. Cl.
CPC .... *F02N 11/0807* (2013.01); *F02N 2200/123* (2013.01)

(58) Field of Classification Search
CPC ....................... F02N 11/0807; F02N 2200/123
USPC ............................................................. 701/2
See application file for complete search history.

(56) References Cited

U.S. PATENT DOCUMENTS 9,156,474 B2 * 10/2015 Holub ............... B60W 50/0098
2007/0106441 A1 * 5/2007 Ono ...................... B60W 20/00 701/36
2011/0202201 A1 * 8/2011 Matsubara .............. B60R 25/00 701/2
2013/0221684 A1 * 8/2013 Markoski .................. H02J 7/00 290/40 R
2015/0051819 A1 * 2/2015 Ellis ...................... F02D 41/021 701/113
2018/0007507 A1 * 1/2018 Ghabra ................ H04B 1/3822
2019/0023223 A1 * 1/2019 Yoo ........................ B60R 25/043
2019/0383239 A1 * 12/2019 Dudar ................ F02M 25/0836
2020/0300136 A1 * 9/2020 Breuer ................... G06V 20/56
2023/0091299 A1 * 3/2023 Lee ....................... H02J 50/005 320/107

FOREIGN PATENT DOCUMENTS

CN 108301910 A 7/2018
WO 2015125151 A2 8/2015

* cited by examiner

*Primary Examiner* — Logan M Kraft
*Assistant Examiner* — John D Bailey

(74) *Attorney, Agent, or Firm* — Joseph Zane; Brooks Kushman P.C.

(57) ABSTRACT

A vehicle includes receives a remote start request from a user, responsive to the request, engage at least one vehicle sensor to determine whether at least an animal or person are within at least a predefined distance from an exhaust or external sounder of the vehicle. Additionally, the vehicle, responsive to determining that the animal or person are withing the predefined distance, delays execution of a remote start, requested by the request, for at least a predefined period of time.

17 Claims, 3 Drawing Sheets

ADAPTIVE EXHAUST CONTROL FOR REMOTE START

TECHNICAL FIELD

The illustrative embodiments generally relate to adaptive exhaust control for remote start.

BACKGROUND

Vehicles can be remotely started using key fobs and commands issued from, for example, a mobile application executing on a mobile phone. While traditionally remote start was limited to the communication range of a key fob, cellular and other longer range communication can be used to issue remote start commands to vehicles from great distances. Remote start can also be scheduled and occur whether or not a user is present at a vehicle, and/or can be achieved through local vehicle interaction, such as with a vehicle external input, e.g., a keypad.

SUMMARY

In a first illustrative embodiment, a vehicle includes one or more processors configured to receive a remote start request and, responsive to the request, engage at least one vehicle sensor designated for use in conjunction with remote start handling, to determine whether any predicates predefined as affecting a remote start are met, based on sensed data. The one or more processors are further configured to, responsive to detecting at least one of the predicates, control a remote start in accordance with a manner predefined in conjunction with the detected predicate, and, responsive to detecting none of the conditions, start the vehicle.

In a second illustrative embodiment, a vehicle includes one or more processors configured to receive a remote start request. The one or more processors are also configured to, responsive to the remote start request, determine if one or more predefined predicates for adapting the remote start are met. Further, the one or more processors are configured to, responsive to at least one of the predicates being met, controlling the remote start in a manner predefined in association with the predicate.

In a third illustrative embodiment, a vehicle includes one or more processors configured to receive a remote start request. The one or more processors are also configured to, responsive to the request, engage at least one vehicle sensor to determine whether at least an animal or person are within at least a predefined distance from an exhaust of the vehicle. Additionally, the one or more processors are configured to, responsive to determining that the animal or person are withing the predefined distance, delay execution of a remote start, requested by the request, for at least a predefined period of time.

DETAILED DESCRIPTION

Figure 1:
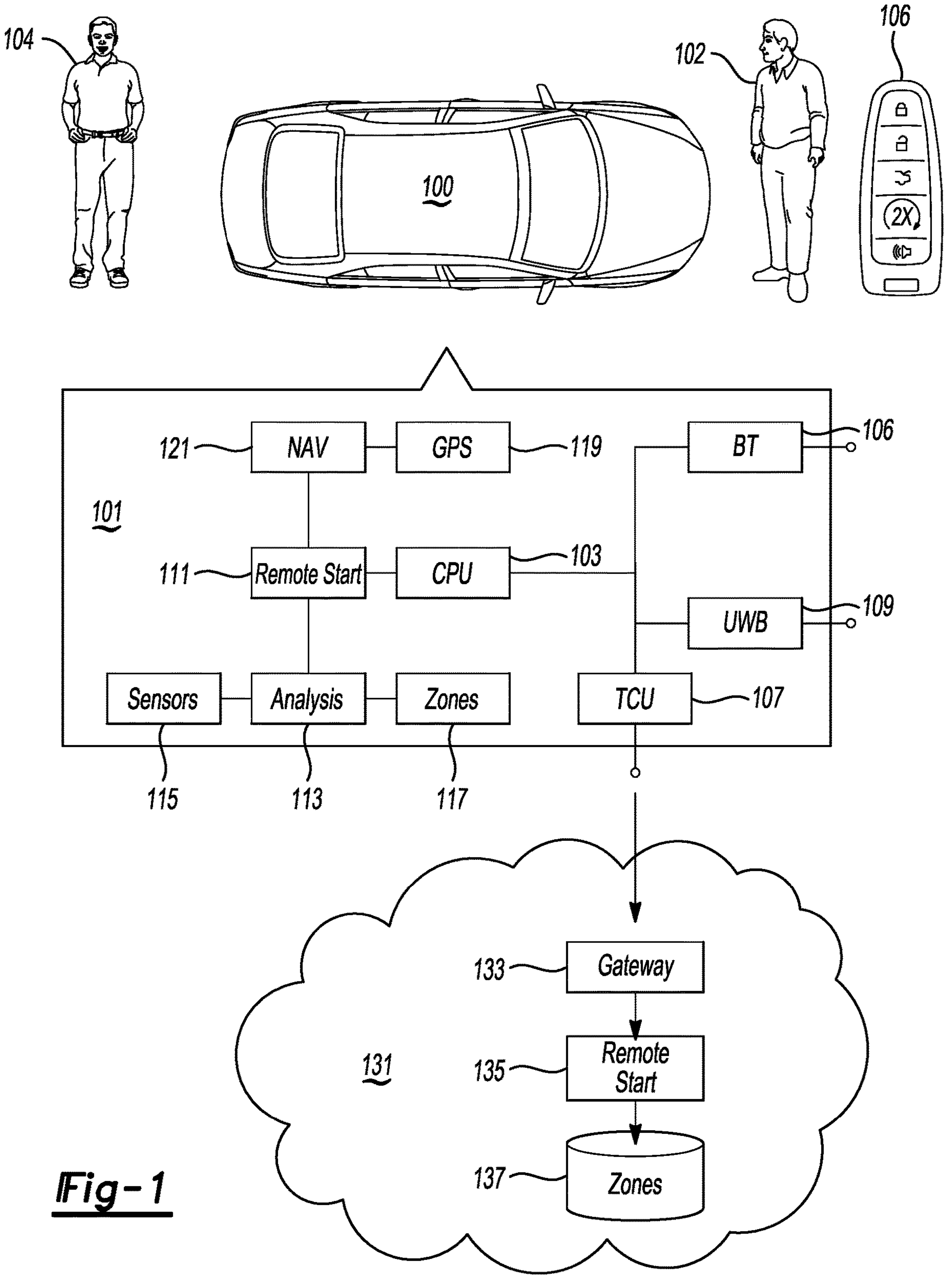
FIG. 1 shows an illustrative example of a vehicle with remote start and adaptive exhaust control.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, BLUETOOTH, Ultra-Wideband (UWB), Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Even when vehicles could be started at merely the communication range of a key fob, users may often not have been aware of the immediate situation surrounding a vehicle. For example, a user may be inside a restaurant, paying a bill, and want to precondition a vehicle by warming up the engine. The vehicle may be outside, out of a line of sight, and the user could issue the command and the vehicle would start. Using the modern communication channels available, it is possible that the user can be great distances away from a vehicle. For example, a user, landing on a flight, could use the in-flight Wi-Fi services to issue a remote start command to the backend. This command could be relayed, from the backend, to the vehicle using cellular communication. Thus, even though the user is 20,0000 feet in the air and 50 miles away, the vehicle could be started. That may be desirable, for example, if significant snow has fallen and the vehicle is expected to be covered in ice and snow. Prolonged or repeated remote starts could warm the vehicle significantly, making clearing ice and snow much easier when a tired traveler arrives at the vehicle. Also, in some instances, vehicles may have scheduled start times, which may or may not have been disabled by a user and which may occur at locations other than, for example, a home location. Even at a home location, however, the user may not want a loud start, and so the control of the exhaust and noise levels, as well as any start delays as described herein, can also be applied to predesignated start times that occur automatically, such as those on a schedule.

When a vehicle remotely starts, it can begin to emit exhaust. When an owner is at a vehicle, they may be aware of surroundings and can control the decision when to start based on the presence of other passersby—i.e., an owner may choose to delay a start when a child is standing directly adjacent to an exhaust pipe. In some performance vehicles, the exhaust may also be very loud, by design, at least when the vehicle is run in certain modes. While owners may enjoy this feature, they may be conscientious enough not to engage it when people or animals, who may be startled, are immediately adjacent to the vehicle.

Of course, when a vehicle is started inside a building, let alone at some great distance away, the owner may not be aware of the immediate surroundings of the vehicle. The illustrative embodiments address this in several manners—first, by providing an option for various start profiles that include, for example, quite mode, "normal" mode and certain "loud" modes for at least certain vehicles having enhanced equipment packages.

Also, the vehicle itself can be reactive and adaptive to surroundings. Many vehicles have significant sensing capability, including cameras, ultrasonic sensing, light detection and ranging (LIDAR), radio detection and ranging (RADAR), sound, etc. These vehicles can detect the presence of people or animals in a number of directions and at a number of proximities. Bluetooth devices, such as phones, detected with a high signal strength or Round Trip Time-of-Flight (RT-ToF) may be considered proximate to the vehicle, and may also serve as a proxy for the presence of a human.

Thus, the vehicle, being aware of its surroundings, can adapt the exhaust profile to produce varied levels of sound upon startup reactive to the surroundings. In some instances, start may even be delayed (e.g., if a person or animal is standing directly behind the vehicle and within an exhaust zone) and in other instances the vehicle may electively downgrade a requested sound level for a start, so as not to startle someone nearby the vehicle. Owners may be able to configure these reactions, setting zones of consideration and proximity considerations, and/or some settings may be built in as default settings from the onset.

The proximity of an owner may also be considered—for example, if an owner requests a certain startup and is immediately adjacent to or within a certain distance from the vehicle, the assumption is that the owner may know the situation and still request the startup—e.g., requesting a "loud" start at an auto show, where pedestrians are expecting the noise. But, even in those cases, the system can be configured to react to passersby who are in certain locations.

FIG. 1 shows an illustrative example of a vehicle with remote start and adaptive exhaust control. In this example, the vehicle 100 is parked at a location and there are two exemplary pedestrians 102 and 104. Pedestrian 102 is the operator, pedestrian 104 is a passerby. The owner may have access to a remote start element such as a key fob 106 or other remote start option, such as a cellular phone running an application, a computer providing access to vehicle controls, etc.

The vehicle 100 includes an onboard computing system 101 that can, among other things, provide for the hardware, software and/or firmware used in the adaptive exhaust control and start control strategies described in the embodiments herein, and the like. This can include, but is not limited to, various electronic control units (ECUs), vehicle onboard communication elements, such as vehicle busses, persistent and non-persistent memories and other storage medium, including at least non-transitory storage mediums, etc.

The computing system 101 may also include one or more processors 103 that control, among other things, onboard communication elements. Those communication elements can include, for example, one or more BLUETOOTH transceivers 105, one or more telematics control units (TCUs) 107, which may include one or more vehicle cellular modems, one or more UWB transceivers 109, etc.

In this example, the computing system 101 also includes a remote start process 111, which can include elements of the various illustrative processes described herein. The remote start process 111 can control the starting of a vehicle, control sensing for pedestrians or other predicates for exhaust and/or start control, evaluate geo-fencing relative to a vehicle 100 location, and perform other functions related to start and exhaust as appropriate.

The computing system may also include one or more analysis processes 113, which have access to vehicle sensors 115. Vehicle sensors can include, for example, ultrasonic sensing, cameras, LIDAR, Classic RADAR, UWB Radar, signal sensors (e.g., a BLUETOOTH transceiver), infrared sensing, motion sensing, and other sensors usable to detect the presence of pedestrians 104, animals, or other predicates for control that can be sensed. Vehicle zones 117 and other predicates may be defined in onboard memory. The zones may define different zones in which predicates may be sensed or detected, and various reactions for exhaust and/or start control to be responsive to those predicates. Definitions for predicates, e.g., people, animals, phone signals, ambient noise levels, etc. may also be stored. These may include minimally sensed sizes, minimal distances, proximity to vehicle elements and other definitions. Granularity of definition may depend on sensor sensitivity—e.g., whether the sensor can tell the difference between a cardboard box being blown in the wind, a raccoon, and a dog, etc. Users may be able to define certain definitions, including detection zones and proximities, delay timing, quite zones, whether the system should revert to auto-quiet under certain defined circumstances, etc. Some definitions may also be predefined by an original equipment manufacturer (OEM) and may or may not be user-alterable.

The predicates for control may include quite zones, which can include mandated quiet zones (e.g., this may include schools and/or hospitals), as well as user preferred quite zones, such as a user house or garage location. In these zones, the start may revert to quiet or normal, as opposed to certain "loud" options, regardless of which start is requested. Some of this may include user preferences for limiting noise, which can also include time-of-day, day of the week, other control predicates may be required based on local ordinances. For example, a user may be required to start at no louder than normal sound levels within 100 feet of a hospital at all times of day, but may also elect to start at those same sound levels between the hours of 8 PM and 7 AM when parked within 500 feet of a home location (so as not to disturb themselves or their neighbors). The remote start process may use onboard maps and navigation system 121 to define these geo-fenced locations, and may compare a vehicle location, obtained from global positioning system (GPS) 119 coordinates or compare data, to determine if the vehicle 100 is within a geo-fence and control the start and/or exhaust accordingly.

A remote backend 131 may include a gateway application 133 for request and response handling for a variety of vehicle-to-user and other communication. This can include instructions to a vehicle 100 to remote start, as well as a type of start requested, and response handling from the vehicle 100, such as sending a response back to a user for further input in a responsive scenario where the user is informed of sensor data and asked to make a decision.

The cloud 131 may include a remote start handling process 135 that includes passing commands back and forth between a user 102 and a vehicle 100. This process 135 may also have access to a larger set of geo-fenced zones 137 as well as any other mandated control predicates that may be stored and defined for certain geographic regions. The vehicle 100 can use the larger database 137 to update the local dataset 117 as needed, so the vehicle 100 can be in remote-start control compliance for wherever it is located, to the extent that any control rules are mandated. These rules (and controls) may also apply to vehicles that are electric but which mimic combustion engine sounds when started, although in those instances concerns about mitigating exhaust may be eliminated and not used as the basis for certain decisions such as delayed start.

Figure 2:
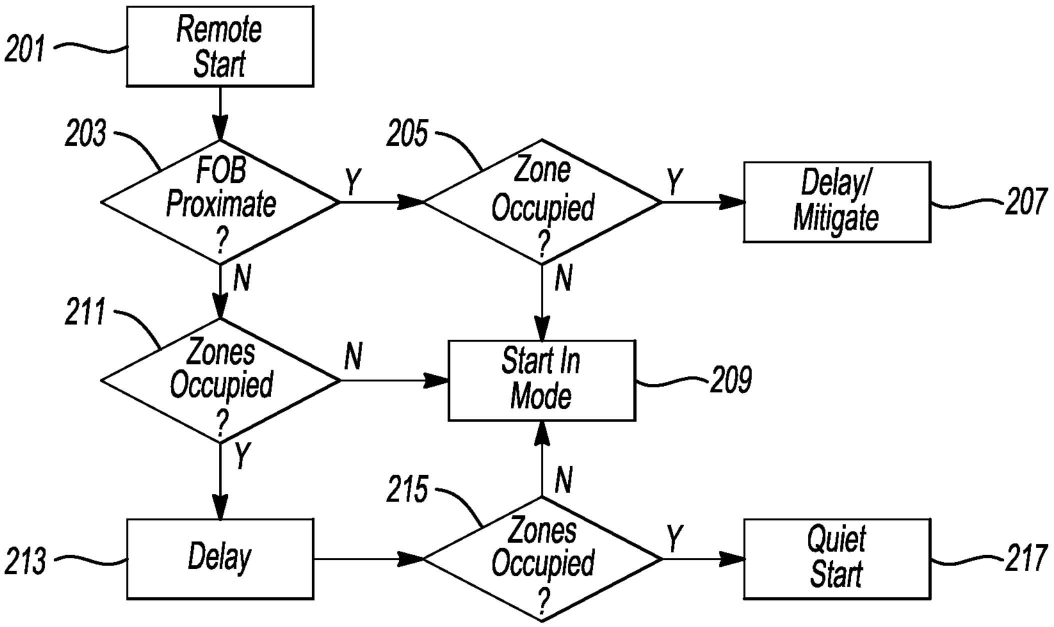
FIG. 2 shows an illustrative adaptive remote start process.

FIG. 2 shows an illustrative adaptive remote start process. This is an example of a process that may run on a vehicle 100. The vehicle 100 receives a remote start command at 201, issued from a fob 106 or other device possessed by operator 104. The vehicle 100 determines if the fob 106 is within a certain proximity to the vehicle 100 at 203.

In this example, if the user is present at the vehicle 100, the process may take different actions. For example, if the user is within a first distance of the vehicle at 203, e.g., 10 feet, which may be determinable based on signal characteristics (e.g., time of flight or received signal strength indicator) from a user device the system may consider whether a zone immediately adjacent the exhaust area is occupied at 205. If the zone is occupied, for example, by a person or animal, the process may engage a start delay at 207. This delay can be until the zone is cleared, or for a time period. The vehicle could also potentially issue an alert or chirp if the zone was not cleared after several seconds or another reasonable period of time. Once the delay has elapsed and/or the zone is cleared of people (which may be the predicate for elapsing the delay), the process can start the vehicle at 209 in the mode requested, since the user is at the vehicle in this scenario.

If the zone is not occupied at 205 and the user is at the vehicle at 203, the process can start the vehicle as requested in the mode requested at 209. This can include, for example, a "loud" exhaust mode, such as can be found on certain performance vehicles. In certain instances, even if the zone is occupied, the delay at 207 may not perpetuate indefinitely, but instead the process may start the vehicle in a quiet mode either immediately or after a short delay. This mode should not startle anyone, and given certain factors, like very cold weather, a user may not want to have the vehicle delay start for too long.

If the fob is not proximate or other indicators indicate that the user is not proximate at 203, the process again determines if zones are occupied at 211. In this instance, the zones may include expanded zones proximate to the vehicle, such as side and forward zones. The choice of zones may also depend on a start mode requested—for example, if a loud start is requested, the vehicle may examine every direction within 10 feet of the vehicle, if a quiet start or normal start is requested, the vehicle may only examine the areas in the rear of the vehicle. If there are no presences in any of the zones considered at 211, the process may start the vehicle in the requested mode at 209.

If there are any presences in any of the zones at 211, the process may again delay a start at 213, either for a period of time or until the zones are cleared. Since the user is not present in this scenario, the process may have a more limited delay, so that the user does not return to find their vehicle unstarted. After the delay, the process may consider the zones once again at 215, and then either start in the requested mode at 209 if no one is present, or in a quiet mode at 217 if one or more zones are still occupied.

Figure 3:
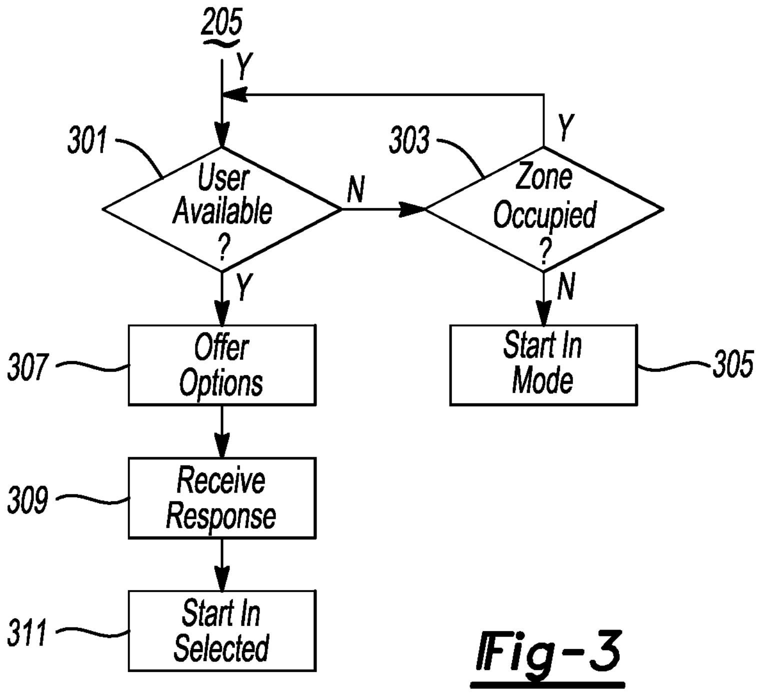
FIG. 3 shows an illustrative user response process for remote start.

FIG. 3 shows an illustrative user response process for remote start. In this example, after determining that a zone is occupied, such as in 205, 211 or 215, for example, the process may issue feedback to the user to allow for a decision to be made. That is, regardless of the start type requested by the user, the process may determine if the user is available for communication at 301, which can include, for example, determining if a mobile application for vehicle communication is engaged.

If the user is not available after some amount of attempting to communicate, and if the zone is not occupied at 303, the process may start in the requested mode at 305. Otherwise, communication feedback can be attempted until, for example, either a timer runs out and the vehicle starts in a quiet mode, or the user becomes available at 301. If the user is available at 301, the user may be presented with start options at 307. These can include, for example, start as requested (i.e., ignore the zone warnings), start in a quieter mode, delay until a zone is cleared, etc. Options may also be limited based on geographic restrictions, either imposed by the user or imposed by ordinance.

The user can choose an option, such as delay for 10 seconds, start in a quieter mode, etc. The process receives the response from the user device at 309 and starts in a selected mode at 311 or takes an instructed action. Response may also be available from a key fob, for example—the fob may vibrate or otherwise indicate to a user that the start was unsuccessful, and the user could reissue the command or issue a different command, if desired.

Figure 4:
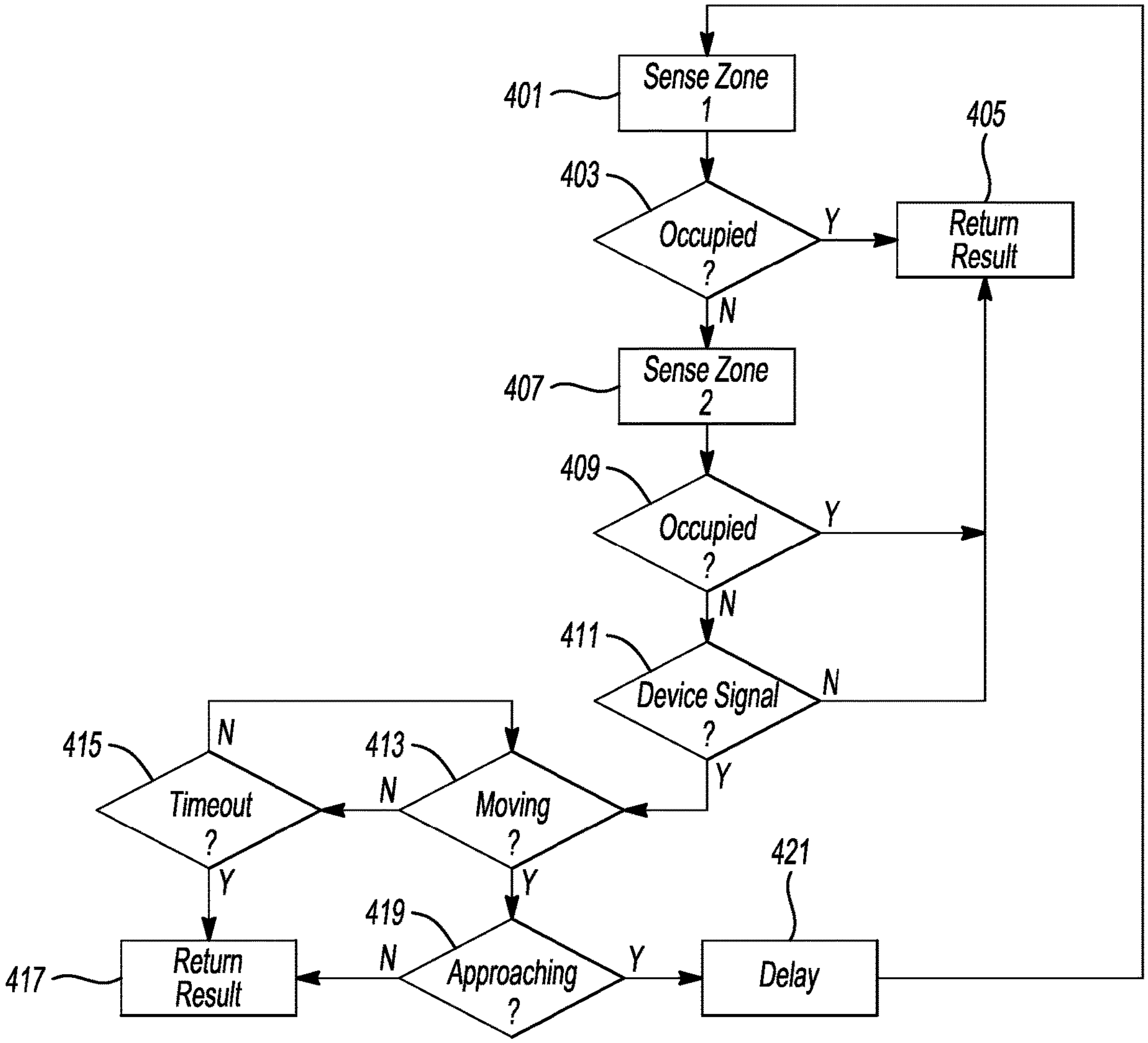
FIG. 4 shows an illustrative sensing process.

FIG. 4 shows an illustrative sensing process. In this example, the process performs a sensing operation in zone 1 at 401, which may be, for example, the rear of a vehicle 100. This can include limited sensing such as motion or object, or more detailed sensing such as the approximate size of an object, the movement pattern of an object, an image of the object enabling Artificial Intelligence (AI) identification, etc. The type of sensing used will depend on the sensors available to monitor the zone, as well as any type of information needed for any control predicates.

If the zone is occupied or anything is sensed in the zone at 403, the process may return the result at 405 to a control process, including any sensor data determined to be pertinent to control. For example, the control process can be aware of the possible sensing capabilities and request certain sensing in certain zones, or in other systems, the process may simply request sensing in general and the vehicle will use available sensors to sense and return any relevant data.

If there are additional zones of consideration, the process may then sense additional zones at 407. This can include side zones, forward zones, etc. The parameters for occupancy may be different for each zone at 409, and the sensing available to each zone may vary with zones as well—e.g., certain zones may not have camera coverage. In light of varied sensing, the user or OEM may configure different predicates for the zones, so that the presence of a person or animal may be sensed more generally in a less sophisticated zone, and more specifically in a zone with more sophisticated sensors. Again, if there is any response to the sensing, such as characteristics indicative of the zone being occupied at 409, the process may return the result at 405.

The process may also search for one or more device signals at 411. Devices are usually carried by people, so the presence of nearby device signals is often indicative of the presence of a person. Proximity to a device can be determined based on, for example, ToF calculations and/or RSSI (Receiver Signal Strength Indicator) calculations.

Unfortunately, devices are not a perfect proxy for people, especially in a parking lot, where people may have left their devices in their vehicle. Accordingly, in this example, the process determines if the signal is moving at 413, which is a good indicator that the device producing the signal is carried by a person. Movement can be determined by changes in time of flight, signal strength, accelerometer, or a GPS receiver if equipped.

If the device is not moving, it is not a guarantee that the device is in a vehicle, but the process will engage a timeout function at 415 to essentially give the device time to move before ignoring the device. Most people are unlikely to be standing still in a parking lot for a great deal of time, so a reasonable timeout of, for example, 20-30 seconds may suffice to allow the process to determine if there is a person present. If there is a timeout, the process may return the result at 417, but that result may be the indication of a stationary device, and the system can respond accordingly, which can include treating the stationary device as not being indicative of a person.

If the device is moving, at 413, the process may determine if the device is approaching or moving away. If the device is approaching, the process may engage a delay designed to give the device time to pass the vehicle at 421, or may delay until, for example, the device is moving away from the vehicle and there is no one in any zone. If the device is not approaching the vehicle, the information can be returned at 417 and the control process can handle the information accordingly—e.g., delay until the device is out of range, delay based on speed of device movement, etc.

Figure 5:
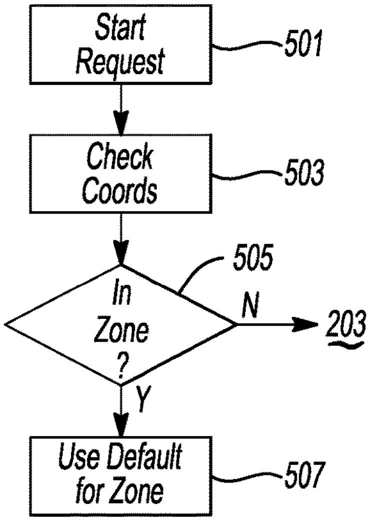
FIG. 5 shows an illustrative geo-fence controlled adaptive remote start process.

FIG. 5 shows an illustrative geo-fence controlled adaptive remote start process. This allows a remote start to be controlled responsive to the location of the vehicle 100. This can include starting in quiet modes in certain areas and/or preventing loud starts in certain areas. A user can designate a location as having either a certain start type associated therewith, or a maximum start type associated. Designation can include drawing a geofence on an application, or defining a perimeter based on an address, for example. Homes, businesses, schools, hospitals, etc. can all be geofenced in this manner. Users can also designate business or location types—e.g., hospital or park, for fencing and the process can dynamically recognize these locations from map data and control startup accordingly. Certain ordinance or regulations may also sound prohibitions to be applied to certain areas, and the system can keep a local record of those areas and can also obtain updated data from the cloud 131, such as when a vehicle 100 parks in an uncommonly visited area.

In this example, the process receives a start request and, as part of the handling, checks the vehicle coordinates 503. This check is against a data set that includes any geo-fences that may surround the current location. If the vehicle is in a zone designated with an exhaust or start control at 505, the process will use the default setting for the zone at 507, or a least lower a requested start profile to a level designated as acceptable by the zone. Otherwise, the process continues evaluating other factors at 203.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:

one or more processors configured to:

receive a remote start request;

responsive to the request, engage at least one vehicle sensor designated for use in conjunction with remote start handling, to determine whether any of one or more prerequisites predefined as affecting a remote start are met, based on sensed data;

responsive to detecting at least one of the one or more prerequisites; control a remote start in accordance with a manner predefined in conjunction with the sensed data indicating the one or more one or more prerequisites, wherein the one or more prerequisites include a location prerequisite including a location of the vehicle corresponding to a defined geofence that includes the location of the vehicle and wherein the manner includes at least one of a maximum noise level or a requirement to start at a minimum noise level, wherein the manner is associated with the location prerequisite based on association with at least one of the defined geofence, a location type corresponds to the defined geofence, or a control parameter associated with all geofences for the vehicle; and responsive to the sensed data indicating none of the one or more prerequisites, start the vehicle.

2. The vehicle of claim 1, wherein the request includes a specified type of remote start having at least a requested exhaust noise level associated therewith.

3. The vehicle of claim 2, wherein the starting the vehicle includes starting the vehicle to accommodate the requested exhaust noise level.

4. The vehicle of claim 1, wherein the one or more one or more prerequisites include at least one of a sensed person or sensed animal in predefined proximity to the vehicle.

5. The vehicle of claim 1, wherein the one or more one or more prerequisites include at least one of a sensed person or sensed animal in predefined proximity to a vehicle exhaust region.

6. A vehicle comprising:

one or more processors configured to:

receive a remote start request;

responsive to the remote start request, determine if one or more predefined prerequisites for adapting the remote start are met; and responsive to at least one of the predicates being met, control the remote start in a manner predefined in association with the prerequisite, wherein the one or more prerequisites include a location prerequisite including a location of the vehicle corresponding to a defined geofence that includes the location of the vehicle and wherein the manner includes at least one of a maximum noise level or a requirement to start at a minimum noise level, wherein the manner is associated with the location prerequisite based on association with at least one of the geofence, a location type that corresponds to the geofence, or a control parameter associated with all geofences for the vehicle.

7. The vehicle of claim 6, wherein the one or more prerequisites include a presence of a moving object within at least one predefined region adjacent the vehicle, the object sensed by at least one vehicle sensor.

8. The vehicle of claim 7, wherein the vehicle sensors include at least one of motion sensors, cameras, LIDAR, RADAR, ultrasonic, sound, or infrared sensors.

9. The vehicle of claim 7, wherein the at least one of the one or more prerequisites further includes a definition of the object as a living being, determinable in a predefined manner based on data sensed by the at least one sensor.

10. The vehicle of claim 7, wherein the manner includes at least one of a delayed start or a quieter start than requested by the received request.

11. The vehicle of claim 7, wherein the one or more prerequisites include a presence of a moving object within at least one of a plurality of predefined regions, wherein at least two of the predefined regions have the manner associated therewith, and wherein the manner associated with at least one of the at least two predefined regions is different from the manner associated with a different of the at least two predefined regions.

12. The vehicle of claim 6, wherein the one or more prerequisites include at least a detected presence of a user device within at least one of a predefined distance or within a predefined zone adjacent to the vehicle and wherein the manner includes starting the vehicle in a manner requested by the request responsive to the user device being detected within the predefined distance.

13. A vehicle comprising:

one or more processors configured to:

receive a remote start request;

responsive to the request, engage at least one vehicle sensor to determine whether at least an animal or person are within at least a predefined distance from at least one of an exhaust of the vehicle or one other source of vehicle sound; and responsive to determining that the animal or person are within the predefined distance, delay execution of a remote start, requested by the request, for at least a predefined period of time, wherein the one or more processors are further configured to start the vehicle in a predefined quiet mode, responsive to the animal or person being sensed within the predefined proximity following the predefined period of time.

14. The vehicle of claim 13, wherein the period of time is defined as a delay until the animal or person are no longer detected within the predefined distance from at least one of the exhaust or the at least one other source of vehicle sound.

15. The vehicle of claim 13, wherein the predefined distance is defined by a predefined sensor zone encompassing the exhaust.

16. The vehicle of claim 13, wherein the sensor includes at least one of a camera or a motion sensor.

17. The vehicle of claim 13, wherein the one or more processors are configured to contact a user device and request an updated remote start instruction, responsive to determining that the animal or person are within the predefined distance.

* * * * *